No. 871,489.
PATENTED NOV. 19, 1907.
C. E. DOW.
COMB FRAME LIFTER.
APPLICATION FILED JAN. 28, 1907.
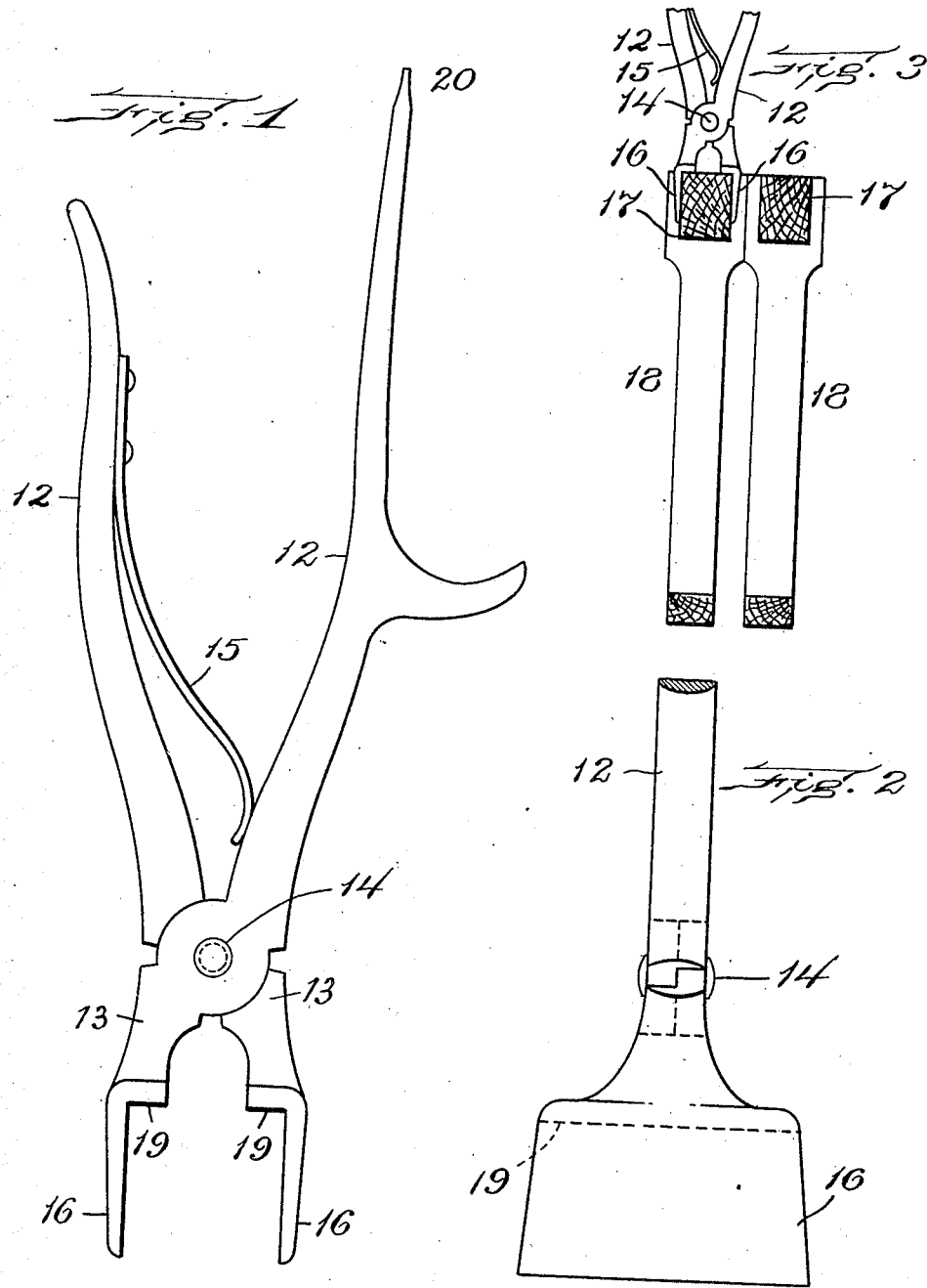

UNITED STATES PATENT OFFICE.

CHARLES E. DOW, OF PLYMOUTH, MASSACHUSETTS.

COMB-FRAME LIFTER.

No. 871,489.

Specification of Letters Patent.

Patented Nov. 19, 1907.

Application filed January 28, 1907. Serial No. 354,383.

*To all whom it may concern:*

Be it known that I, CHARLES E. Dow, of Plymouth, in the county of Plymouth and State of Massachusetts, have invented certain new and useful Improvements in Comb-Frame Lifters, of which the following is a specification.

This invention has for its object to provide a device for lifting comb frames used in beehives for the bees to build their honeycombs upon. It is customary to place a series of these frames side by side, the frames being of rectangular form, and having vertical end pieces which are wider at their upper ends than the horizontal top pieces of the frame, so that narrow spaces exist between the horizontal top pieces or bars. In removing the comb frames with the combs therein contained, it is necessary to grasp each frame by its top bar, and lift it from its place in the hive. In view of the close proximity of the frames to each other and of the fact that they are usually more or less stuck together by beeswax and honey, it is often a matter of some difficulty to grasp the frames with sufficient firmness to raise them from their places in the hives.

My invention has for its object to provide a device which will effectively perform this operation, and it consists in a comb frame lifter comprising a pair of levers connected by a fulcrum pin, and having longer arms and shorter arms, the longer arms constituting handles, while the shorter arms are formed as thin jaws adapted to be inserted between the sides of top bars of adjacent comb frames, each jaw having at its inner edge an inwardly-projecting shoulder adapted to abut against the upper edge of the top bar between the two jaws, and limit the depth of insertion of the jaws between the frames, so that the jaws will not be liable to crush and injure the combs below the top bars.

Of the accompanying drawings, forming a part of this specification, Figure 1 represents an edge view of an appliance embodying my invention. Fig. 2 represents a side view of the same. Fig. 3 represents a view similar to Fig. 1 on a reduced scale, showing the jaws engaged with the top bar of a comb frame.

The same letters of reference indicate the same parts in all the figures.

My improved comb frame lifter is composed of two levers, each having a longer arm 12 and a shorter arm 13, the levers being connected by a fulcrum pin 14. The longer arms 12 are formed as handles adapted to be grasped by one hand of the operator, and closed together against the pressure of a spring 15 attached to one of the handles, and bearing against the other, said spring tending to force the handles apart. The outer portions of the shorter arms 13 are widened and reduced in thickness and flattened, so that they constitute relatively thin blades or jaws 16 adapted to be inserted in the narrow spaces between the top bars 17 of adjacent comb frames 18, as shown in Fig. 3. Each jaw 16 has at its inner edge, an inwardly-jaw 16 has at its inner edge, an inwardly-projecting shoulder 19, said shoulders being adapted to abut against the upper side of the top bar 17 between the two jaws 16. The width of the shoulders 19 is such that when the jaws 16 are adjusted to simultaneously enter the spaces at opposite sides of a comb frame, one or both of the shoulders will abut against the upper surface of said top bar, and thus prevent the jaws from passing downwardly between the frames far enough to crush any projecting portion or portions of the honeycomb below the top bar.

The described device is used by inserting the jaws 16 in the spaces at opposite sides of the top bar of the frame to be removed, until the shoulders abut against the upper edge of said top bar, and then closing the jaws 16 together by inward pressure on the handles 12 until the top bar is firmly grasped by the jaws. The lifter is then raised, and draws the frame from its position, the bearing of the shoulders 19 on the upper edge of the frame enabling the operator to hold the frame firmly between the jaws without liability of the tipping of the frame. One of the handles 12 is preferably extended and reduced at its outer end to form a blade 20, which is preferably proportioned like the blade of a screw driver, and is adapted to be used as such, or to loosen the frames before raising them, the frames being often caused to adhere to their supports in the hive by wax, etc.

I claim:

A comb frame lifter comprising a pair of levers connected by a fulcrum pin and having longer arms and shorter arms, the longer arms constituting handles, while the shorter arms are reduced in thickness and flattened to form wide thin jaws adapted to be inserted between the sides of the top bars of adjacent comb frames, each jaw having at its inner edge an inwardly projecting shoulder adapted to abut against the upper edge of the top bar between the two jaws, and limit the depth of insertion of the jaws between the frames.

In testimony whereof I have affixed my signature, in presence of two witnesses.

CHARLES E. DOW.

Witnesses:
 ARTHUR N. WOOD,
 W. C. HATHAWAY.